Patented Sept. 19, 1922.

1,429,430

UNITED STATES PATENT OFFICE.

HARRY N. HOLMES AND DONALD H. CAMERON, OF OBERLIN, OHIO.

EMULSION.

No Drawing.   Application filed April 27, 1921. Serial No. 465,020.

*To all whom it may concern:*

Be it known that we, HARRY N. HOLMES and DONALD H. CAMERON, citizens of the United States, residing at Oberlin, in the county of Lorain and State of Ohio, have invented certain new and useful Improvements in Emulsion, of which the following is a specification.

This invention relates to emulsions, and more particularly emulsions of the "water-in-oil" type.

Emulsions can be classed in two general groups, to-wit, the "oil-in-water" type and the "water-in-oil" type. In the first type drops of "oil" are distributed throughout a more or less continuous body or mass of "water" and in the second, drops of "water" are distributed throughout a more or less continuous body or mass of "oil". Either emulsion will wet an article touched by the emulsion with the body substance, to-wit, that substance which includes or surrounds the drops of the other substance, in other words. water in the first type of emulsion and oil in the second. (See page 261 of Applied Colloid Chemistry, by Wilder D. Bancroft, published 1921 by the McGraw-Hill Co.)

Both types of emulsion are produced by the use of an "emulsifying agent", a substance or mixture of substances usually of a colloidal nature, which must be more or less soluble in or wetted by the surrounding body liquid. As this invention has to do only with emulsions of the second type above referred to, it is sufficient to note that emulsifying agents for this type of emulsion have usually been the calcium, magnesium and aluminum soaps, other heavy metallic soaps, lamp black, or wool fat, (lanolin). Even with such emulsions the emulsion is not permanent and finally breaks, the drops of the "water," or watery material, finally running together, so that the two liquids form two layers.

We have discovered that more stable emulsions of the "water-in-oil" type may be produced by the use of proper solutions or suspensions of a varnish gum, and particularly gum dammar, as an emulsifying agent. This emulsifying agent (gum dammar) functions after the manner of a colloid, or at least has colloidal properties. Only relatively dilute solutions or suspensions of this gum are necessary, say approximately 1 to 5 per cent. Moreover, this varnish gum can serve as an effective emulsifying agent in a great many, if not in all, of the various "water-in-oil" emulsions. It, of course, is effective in every instance where it can be brought into solution with or is wetted by the "oily" agent. In these emulsions of the "water-in-oil" type, the watery material of the drops can be water or glycerine and in certain cases glycol, or any mixtures of the same, or solutions of liquid or solid material in these substances, or even suspensions of solid particles in these substances. The oily body may be one or more of various oils, fats, greases and waxes, and also many organic liquids such as benzene (benzol), toluene, carbon tetrachloride, carbon disulfide, ether, petroleum or its fractional distillates or its residues, chloroform, or other suitable liquids that will dissolve gum dammar but which do not react harmfully therewith.

For example, an emulsion may be formed by dissolving 1 to 5 per cent of gum dammar in benzene (benzol), mixing a quantity of water or gylcerine therewith and agitating the mixture. The effect of agitation is to break up the watery material into finer and finer drops according to the degree of shaking. Around each drop there appears to be formed a tangible film or skin of semi-solid form, elastic and quite flexible. This film or skin appears to be distinctive of our improved emulsion and has been definitely noted as a tangible thing, in many cases easily visible around large drops, in which it differs from prior emulsions. The skin is tangible because it quickly forms about a single large drop of water placed in a benzene solution of gum dammar and can be removed from the drop and inspected. The precise action is difficult to ascertain, but it is probable that the gum in the benzene has become more concentrated at the surface of each drop. This skin or film is so persistent that for a considerable time it prevents the drops of water or watery material from running together. An attempt to break the film merely causes it to heal over and create two or more drops where there was one before.

Other varnish gums than gum dammar may be used for the same purpose but not so effectively. For example, varnish gums such as mastic, sandarac, kauri and shellac appear to form a skin or film, but it is more or less brittle and is likely to allow the drops to bleed or coalesce. In general none of the other substances used as emulsifying agents in making "water-in-oil" emulsions are as efficient as gum dammar in preparing concentrated and stable emulsions.

In the production of the emulsion, the average drop size may be controlled by the relative proportions of all materials used, the temperature of the mixture and the process of homogenization. Emulsification can be accomplished by any of the well known methods, such as violent shaking, grinding, stirring, or by throwing the mixture against baffles or other perforated walls.

This emulsifying agent (gum dammar) is capable of use in many ways, some examples of which are as follows:

In the manufacture of pharmaceutical preparations petroleum jelly may be made to include and carry drops of water, glycerine, watery solutions of solids or liquids, or watery pastes, any or all of which may carry medicinal or antiseptic material, by the use of gum dammar as an emulsifying agent.

In the manufacture of inks, carbon black or varnish inks may be diluted with drops of water or watery materials to give a suitable or desirable body, thus lessening the cost of the product without necessarily interfering with the quality of the inks. The lithographic inks, which are composed of pigment in an oil vehicle may also be diluted with water or watery materials by this process of emulsification with the aid of gum dammar as the emulsifying agent.

Cleaning compounds may also be produced by mixtures of organic grease solvents and aqueous cleaning or bleaching compounds.

Paints consisting of pigment in oil or organic solvents may have a desirable amount of water or watery material emulsified therewith in a stable form by the aid of gum dammar as the emulsifying agent.

One of the most important uses of the invention is in color photography. In this case, a color screen may be readily formed by a cheap and simple process. As an example, a water soluble dye may be added to a gelatin water solution and this solution while in the liquid state may be emulsified in a benzene (benzol) gum dammar solution or suspension. Petroleum distillates, ether, carbon disulphide, chloroform, turpentine, toluene, carbon tetrachloride or any other organic liquid or mixtures of organic liquids which will dissolve the emulsifying agent, gum dammar, (and will not dissolve in the watery material) may be used as a substitute for benzene (benzol). The mixture is violently agitated to reduce the size of the gelatine-water drops containing dye to as small a size as is desirable. By making up two, three or more different emulsions each one carrying drops of gelatin-water dyed a color different from that of the other emulsions used it is possible to mix these vari-colored emulsions so as to obtain one emulsion carrying drops of the several different colors. The emulsion thus formed is coated upon a suitable support such as a glass plate, film or the like. As before stated, the effect of the gum dammar as an emulsifying agent appears to form a tangible film or skin around each separate drop. When the emulsion is coated upon glass or film or other suitable support the benzene evaporates, leaving the separate drops lying upon the plate each coated with a film or skin containing the gum dammar. This is a varnish gum which now serves for a new purpose, to-wit, as a cement or glue to stick the drop to the plate or support. The skin or film also prevents any tendency for the drops to bleed or run together, but each little mass of colored gelatine water solution is held separate from all the others. The water in the gelatin water drop slowly evaporates leaving upon the support dyed gelatin particles cemented to the plate by dammar varnish. This mosaic plate or screen may be used in the same way as other screens in color photography. The screen may be coated with photographic emulsion and used in a manner similar to the autochrome plate. Each colored particle may also carry sensitive silver salts or other light sensitive material and thus become a miniature plate incorporated with a monochromatic color screen. The dyed particles may also be rendered insoluble in water by treatment with formaldehyde or other substance which will render the gelatin insoluble in water.

Other uses of the invention will also occur to those skilled in the art to which it pertains, those instances above recited being mentioned merely for purposes of illustration and not in any sense of limitation.

What we claim is:

1. An emulsion of the "water-in-oil" type including an emulsifying agent capable of forming a tangible skin or film around each "watery" drop.

2. An emulsion of the "water-in-oil" type including an emulsifying agent capable of forming a flexible and elastic skin or film around each "watery" drop.

3. An emulsion of the "water-in-oil" type including gum dammar as an emulsifying agent.

4. An emulsion of the "water-in-oil" type comprising a mixture of a liquid of the "water" type and a solution containing gum dammar.

5. The process of forming a "water-in-oil" emulsion consisting in mixing together a liquid of the "water" type with a liquid of the "oil" type in the presence of gum dammar.

In testimony whereof we hereby affix our signatures.

HARRY N. HOLMES.
DONALD H. CAMERON.